United States Patent [19]

Wong

[11] Patent Number: 5,015,896
[45] Date of Patent: May 14, 1991

[54] TERMINAL ARRANGEMENT FOR AN ELECTRIC MOTOR

[75] Inventor: To-Fan Wong, Aberdeen, Hong Kong

[73] Assignee: Johnson Electric S.A., La Chaux de Fonds, Switzerland

[21] Appl. No.: 456,640

[22] Filed: Dec. 27, 1989

[30] Foreign Application Priority Data

Dec. 30, 1988 [GB] United Kingdom ............... 8830392

[51] Int. Cl.$^5$ ................................. H02K 11/00
[52] U.S. Cl. ................................. 310/71; 310/42; 310/89; 310/239
[58] Field of Search .............. 310/71, 42, 89, 239, 310/230, 248, 249, 242; 336/107, 192

[56] References Cited

U.S. PATENT DOCUMENTS

| | | | |
|---|---|---|---|
| 4,157,483 | 6/1979 | Frimley | 310/229 |
| 4,523,116 | 6/1985 | Dibbern, Jr. | 310/42 |
| 4,728,835 | 3/1988 | Baines | 310/89 |

FOREIGN PATENT DOCUMENTS

| | | | |
|---|---|---|---|
| 1142949 | 1/1963 | Fed. Rep. of Germany | 310/71 |
| 3818891 | 12/1988 | Fed. Rep. of Germany | 310/71 |
| 2160363 | 12/1985 | United Kingdom | 310/71 |
| 2203294 | 10/1988 | United Kingdom | 310/71 U X |

*Primary Examiner*—R. Skudy
*Attorney, Agent, or Firm*—Fleit, Jacobson, Cohn, Price, Holman & Stern

[57] ABSTRACT

In a terminal arranged for an electric motor a male power supply terminal is received in a channel in the motor housing. A female terminal in the housing has a relatively long arm which pivots about a first end and carries a relatively short arm at its other end. The male terminal, on being inserted in the channel, bears on the short arm and first displaces the long arm by pivoting it about the first end until it abuts a stop. Further insertion of the terminal then causes the second arm to pivot about the other end of the first arm. Displacement of the second arm requires a relatively greater force than displacement of the first arm.

3 Claims, 1 Drawing Sheet

TERMINAL ARRANGEMENT FOR AN ELECTRIC MOTOR

INTRODUCTION

The present invention relates to a terminal arrangement for an electric motor, and in particular to a female terminal in a fractional horsepower PMDC motor.

BACKGROUND TO THE INVENTION

In some applications for small PMDC motors, the motors are inserted into a sub-assembly by a robot. The sub-assembly will comprise male power supply terminals which mate with female terminals on the motor. To ensure a good connection, the male terminal is gripped tightly using a strongly sprung female terminal. The female terminal must be displaced against the spring force by the male terminal as it is inserted and this can result in damage to the male terminal which may not be sensed by the robot when installing the motor.

SUMMARY OF THE INVENTION

The present invention provides a terminal arrangement for an electric motor, the arrangement comprising a slot formed in a housing of the motor for receiving a male terminal, and an electrical contact within the slot for making an electrical connection with the terminal when it is inserted in the slot, wherein the electrical contact is arranged to be displaced by the terminal as it is inserted in the slot, the contact being displaced against a relatively small biassing force as the terminal is inserted initially in the slot and then against a relatively strong biassing force as the terminal is inserted fully into the slot.

The male terminal can thus be partially inserted into the slot and lightly held by the electrical contact before being pushed fully home against the stronger force of the contact which ensures a good electrical connection.

Other, preferred, features and advantages of the invention will be apparent from the following description and the accompanying drawings.

DESCRIPTION OF THE PREFERRED EMBODIMENT

Figure 1:
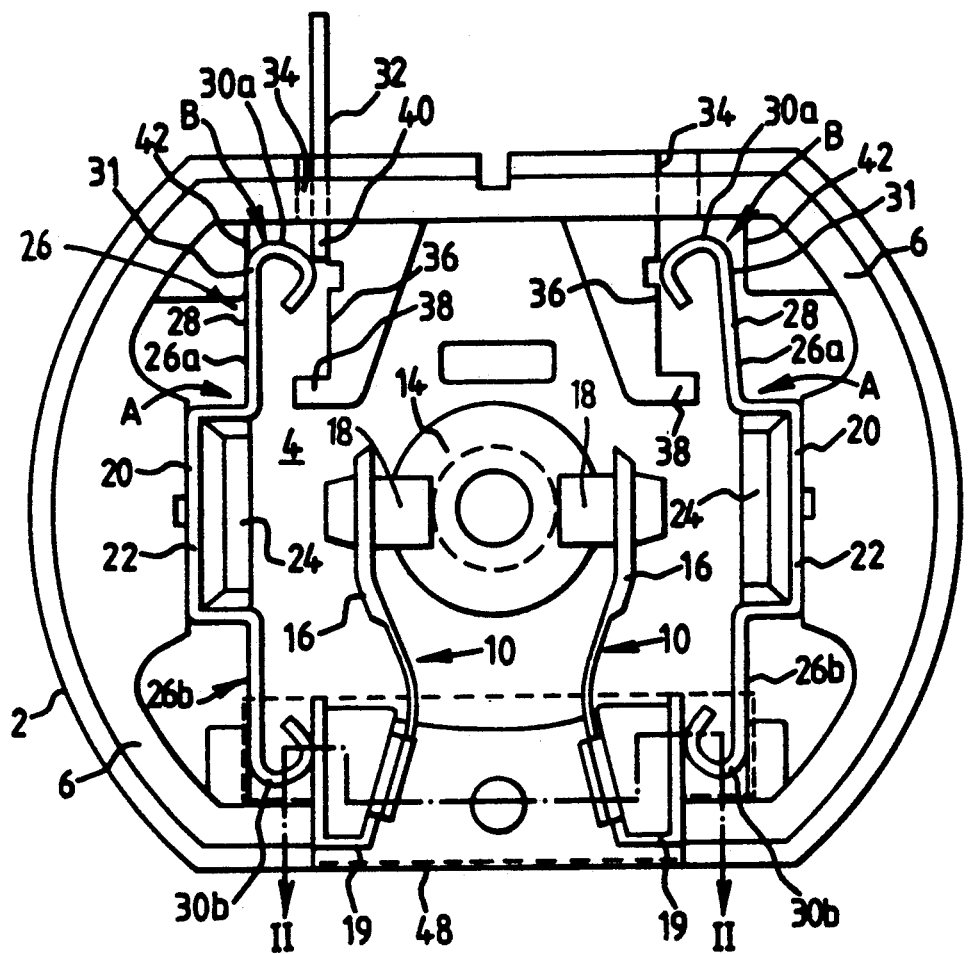
FIG. 1 is a plan view of the inside of an end cap for a fractional horsepower PMDC motor embodying the invention.

The drawing shows an end cap forming part of a motor housing of the type described, for example, in British patent application 2203294, particularly in FIGS. 5 to 9 thereof.

A plastics end cap 2 has an end wall 4 and a peripheral wall 6 which is received inside the end of a can-like motor casing (not shown). The end cap 2 carries two brush assemblies 10.

The end wall 4 carries a bearing 14 for a motor shaft (not shown). The brush assemblies 10 each comprises a flexible strip 16 of, for example, beryllium-bronze, carrying a carbon brush 18 and a less resilient brush assembly portion 19 of copper which is crimped or rivetted to the strip 16.

Two contact strips 20 extend across the end cap. Each strip 20 comprises a central portion 22 which is sandwiched between the wall 6 and a post 24. Portion 22 may be dimpled to ensure a tight fit between the wall 6 and post 24.

At each end of the central portion 22 are resilient first and second arms 26a, 26b which are substantially symmetrically disposed at the opposite ends of the central portion 22.

Each arm 26a, 26b comprises a first limb 28 which is arranged to flex about a pivot point A adjacent the post 24. A second limb 30a on the outer end 31 of the arm 26, distal of the pivot point A, is arranged to flex about a pivot point B. The limb 30a is generally V-shaped and the apex of the V makes contact with a brush assembly portion 19 or a power supply terminal 32.

Two slots 34 are formed in the wall 6 for insertion of respective male power supply terminals 32. When a power supply terminal is not inserted (the right hand side of the drawing) the V-shaped limb 30a rests against a wall 36 which is an extension of a wall of the respective slot 34. Wall 36 ends in a toe 38. As a terminal 32 is inserted (the left hand side of the drawing) the tip 40 of the terminal engages the V-shape limb 30a, causing the arm 26a to pivot about point A until the end 31 of the arm 26a abuts a wall 42. Because of the length of the arm 26a, there is a relatively smaller biassing force tending to urge the limb 30a back towards the wall 42 when the male terminal 32 is initially inserted into the slot. Once the end 31 abuts the wall 42, further insertion of the terminal 32 requires that the limb 30a pivot about point B. Because of the relatively short distance between the apex of the V-shaped limb and the pivot point B, a relatively greater biassing force resists movement of the limb 30a and hence ensures a secure contact with the body of the terminal 32.

During the initial insertion of the terminal 32, the limb 28 is pushed back relatively easily against the wall 42 and so misalignment of the terminal 32 and the motor housing is less likely to damage the terminal 32 and a light force can be used. Once the terminal is partially received in the housing greater force can be used to push the terminal home against the pressure of limb 30a.

The tip 40 of the terminal abuts the toe 38 to limit insertion of the terminal.

Figure 2:
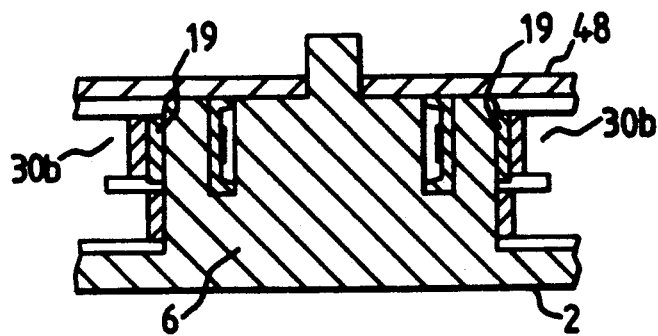
FIG. 2 is a cross-section along the line II—II of FIG. 1.

The V-shaped limb 30b on the end of the each arm 26b is bifurcated, one part of the fork abutting a wall on the end cap and the other bearing on the brush assembly portion 19. This ensures that the arm 26 sits squarely on the brush assembly portion 19 (FIG. 2).

To assemble the end cap, the brush assemblies 10 are mounted on the end cap 2 and the contact strips 20 inserted between the wall 6 and posts 24.

A insulation sheet 48 of consisting of a resinous material such as MYLAR (trade mark) shown in dotted outline in FIG. 1 covers the brush assembly portions 19 and provides a layer of insulation between the portions 19 and the motor casing. The sheet is located on a pin 12 on the wall 6.

Various modifications may be made to the described embodiment and it is desired to include all such modifications as fall within the accompanying claims.

What is claimed is:

1. A terminal arrangement for an electric motor comprising an end cap for the motor with a slot formed therein for receiving a male terminal, an electrical contact strip mounted in the end cap for contacting the male terminal, in which the contact strip has a central portion and a resilient first arm extending from the central portion into the slot, the first arm comprising a first limb pivotable about a first pivot point adjacent the central portion, and a second limb at an outer end of the first arm pivotable, about a second pivot point adjacent the outer end of the first arm, wherein the slot has a first wall against which the second limb rests and which forms a guide against which the terminal is guided by the second limb when the terminal is inserted into the slot, and the slot has a second wall against which the second limb is pressed when the male terminal is initially inserted in the slot, pivoting the first limb about the first pivot point, and in which the second limb is pivoted about the second pivot point as the male terminal is further inserted, the contact strip having a smaller resistance to displacement about the first pivot point than about the second pivot point so that the contact strip is displaced against a relatively smaller biassing force when the male terminal is initially inserted into the slot and then against a relatively greater biassing force when the male terminal is further inserted into the slot.

2. A terminal arrangement according to claim 1, in which the contact strip has a second resilient arm extending from the central portion opposite the first arm, the second resilient having an outer end which engages a portion of a brush assembly against which the second limb bears, and a brush gear part which presses the further second limb about the further second pivot point and against said further wall.

3. A terminal arrangement according to claim 2 wherein the first and second resilient arms are substantially symmetrically disposed at opposite ends of the central portion.

* * * * *